Dec. 28, 1926.  1,612,207
R. H. NORTON ET AL
APPARATUS AND METHOD FOR MAKING BOX BLANKS
Filed Dec. 17, 1925   9 Sheets-Sheet 9
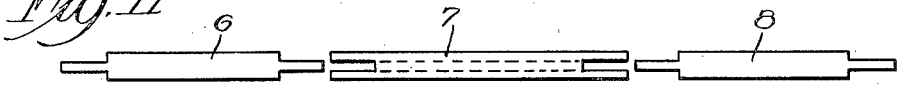
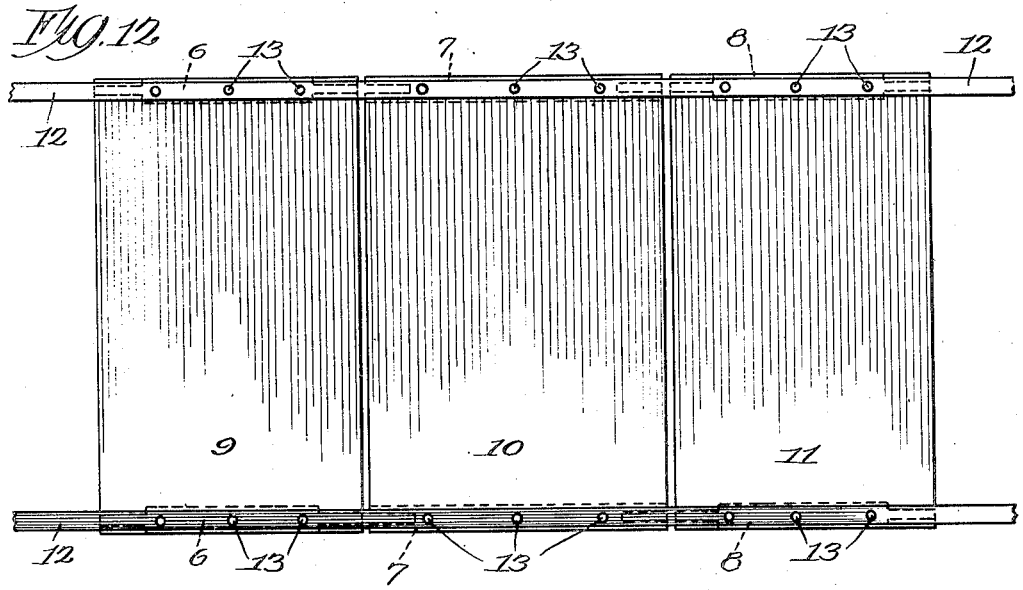
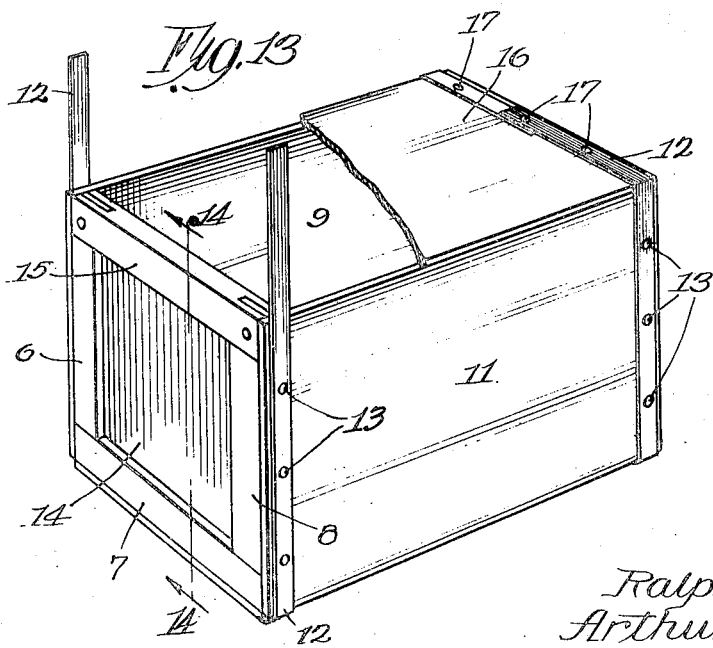
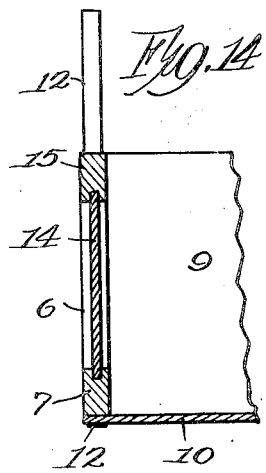
Inventors:
Ralph H. Norton
Arthur T. Campbell
By Arthur H. Durand Patented Dec. 28, 1926.

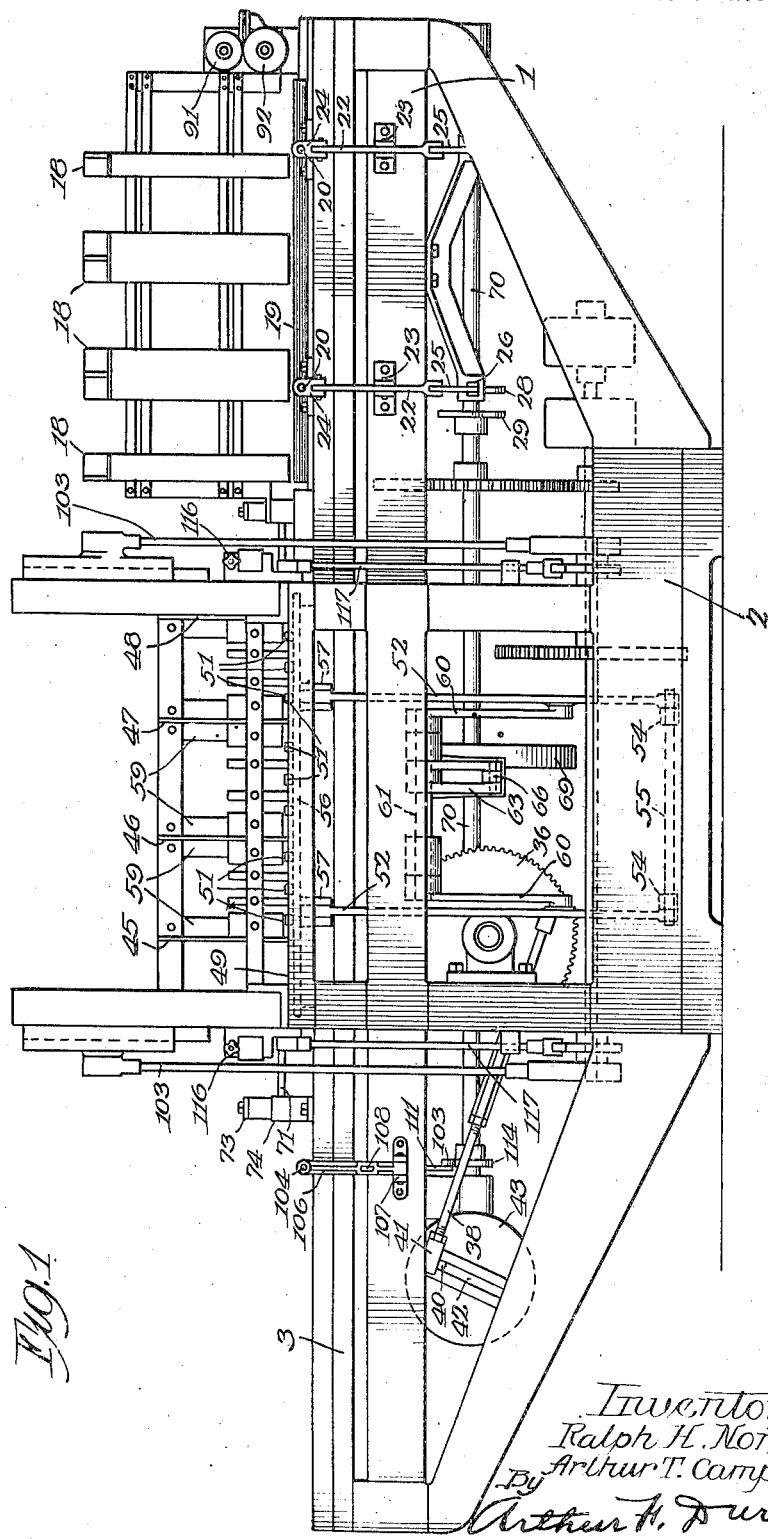

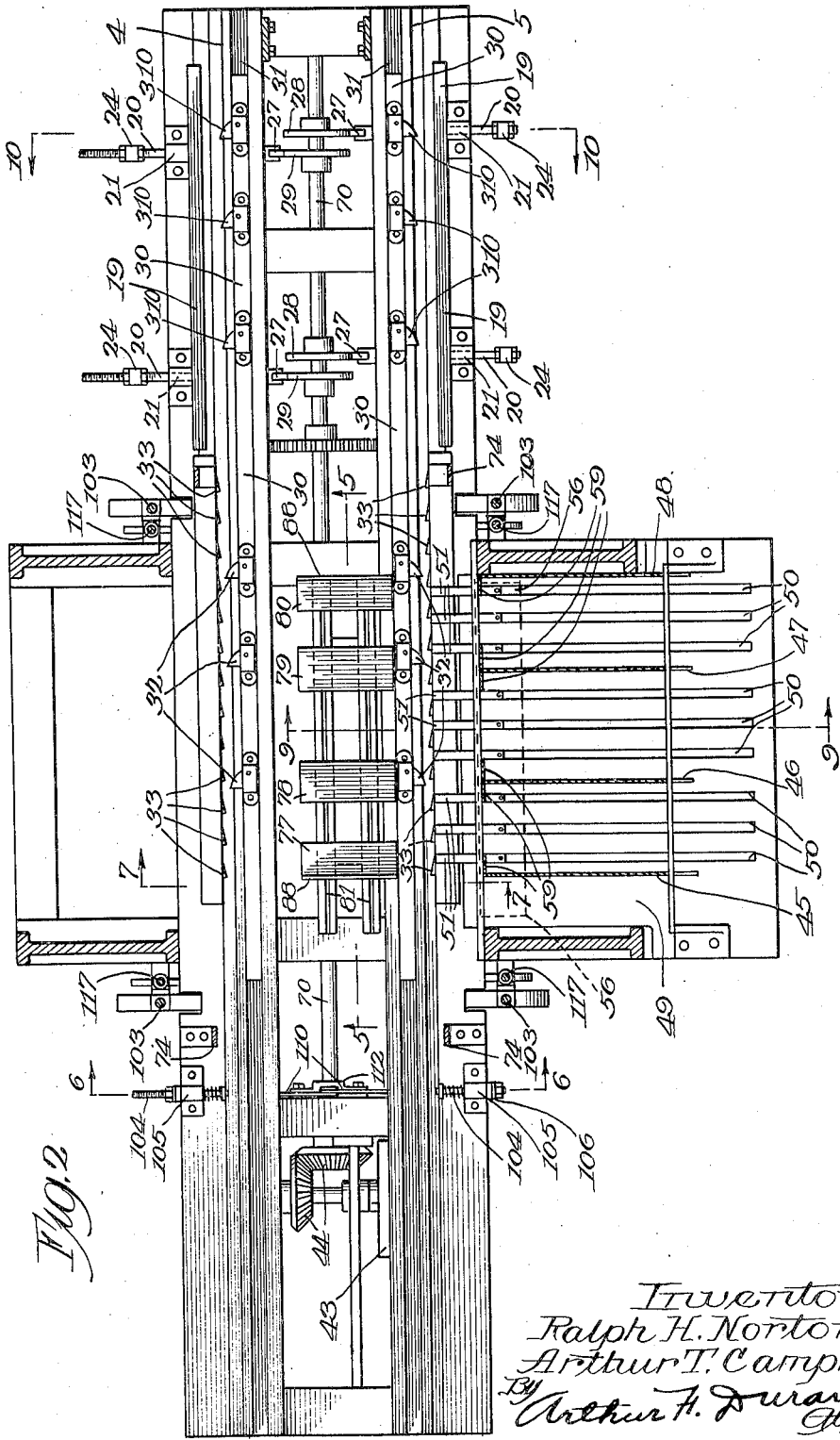

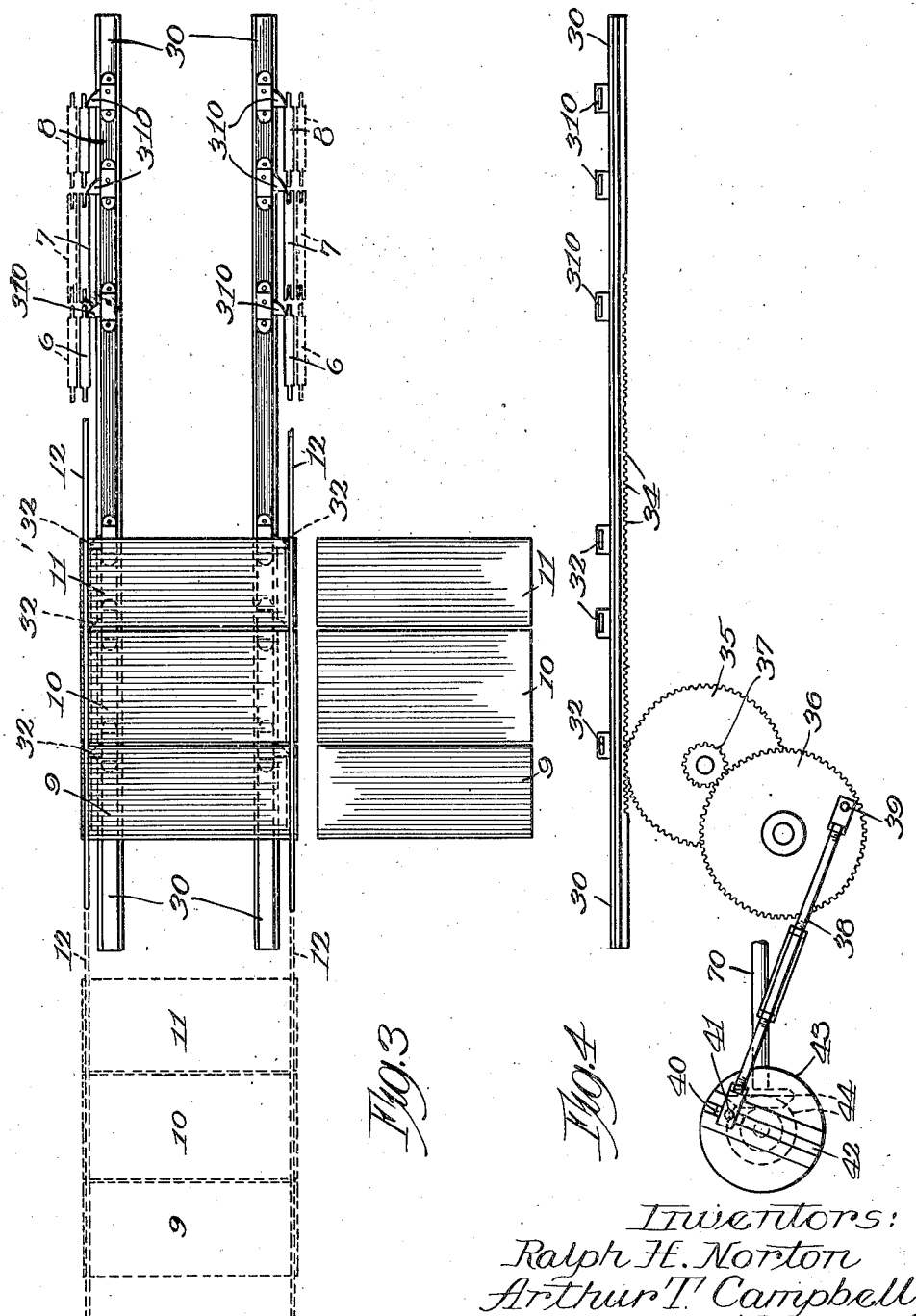

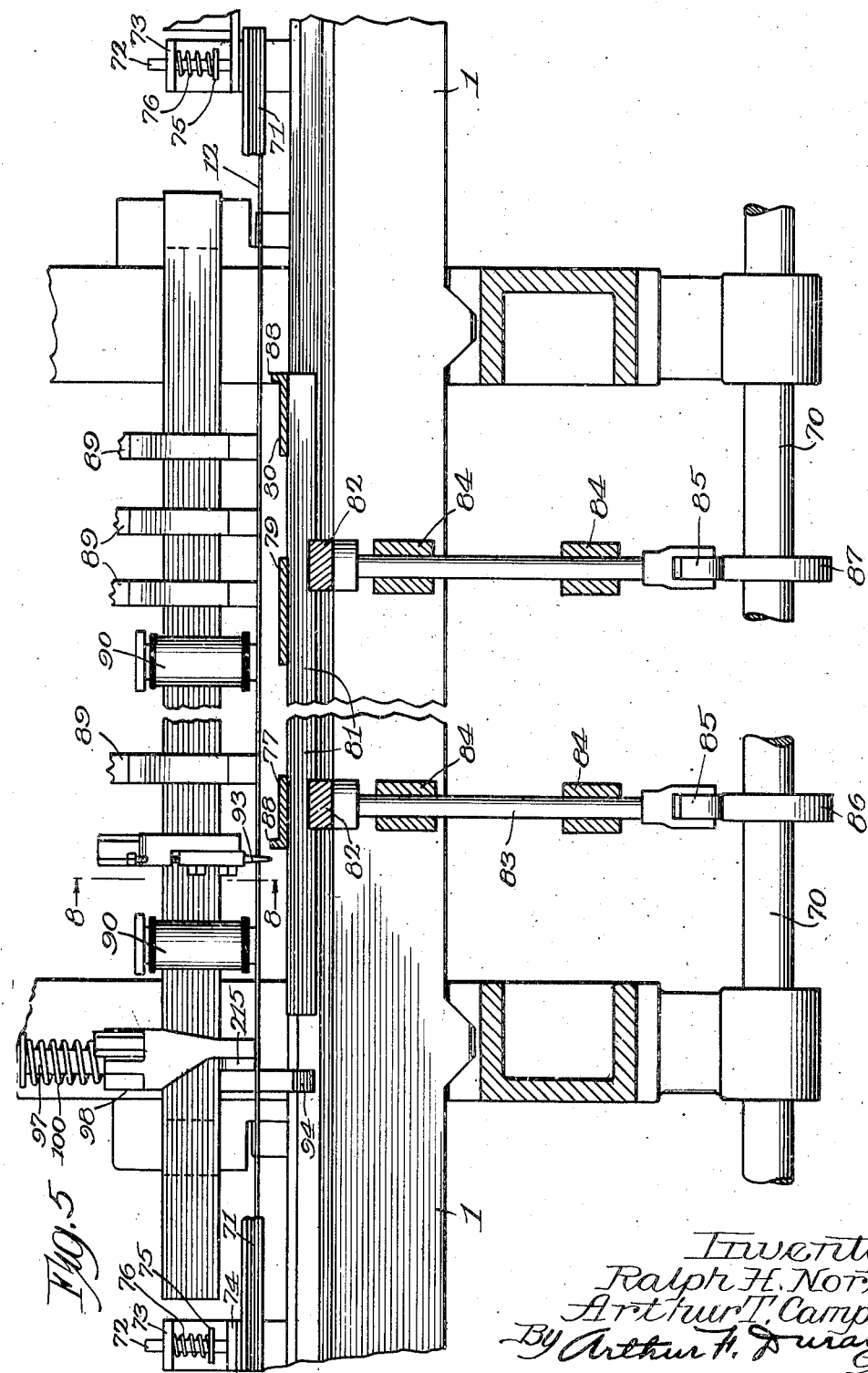

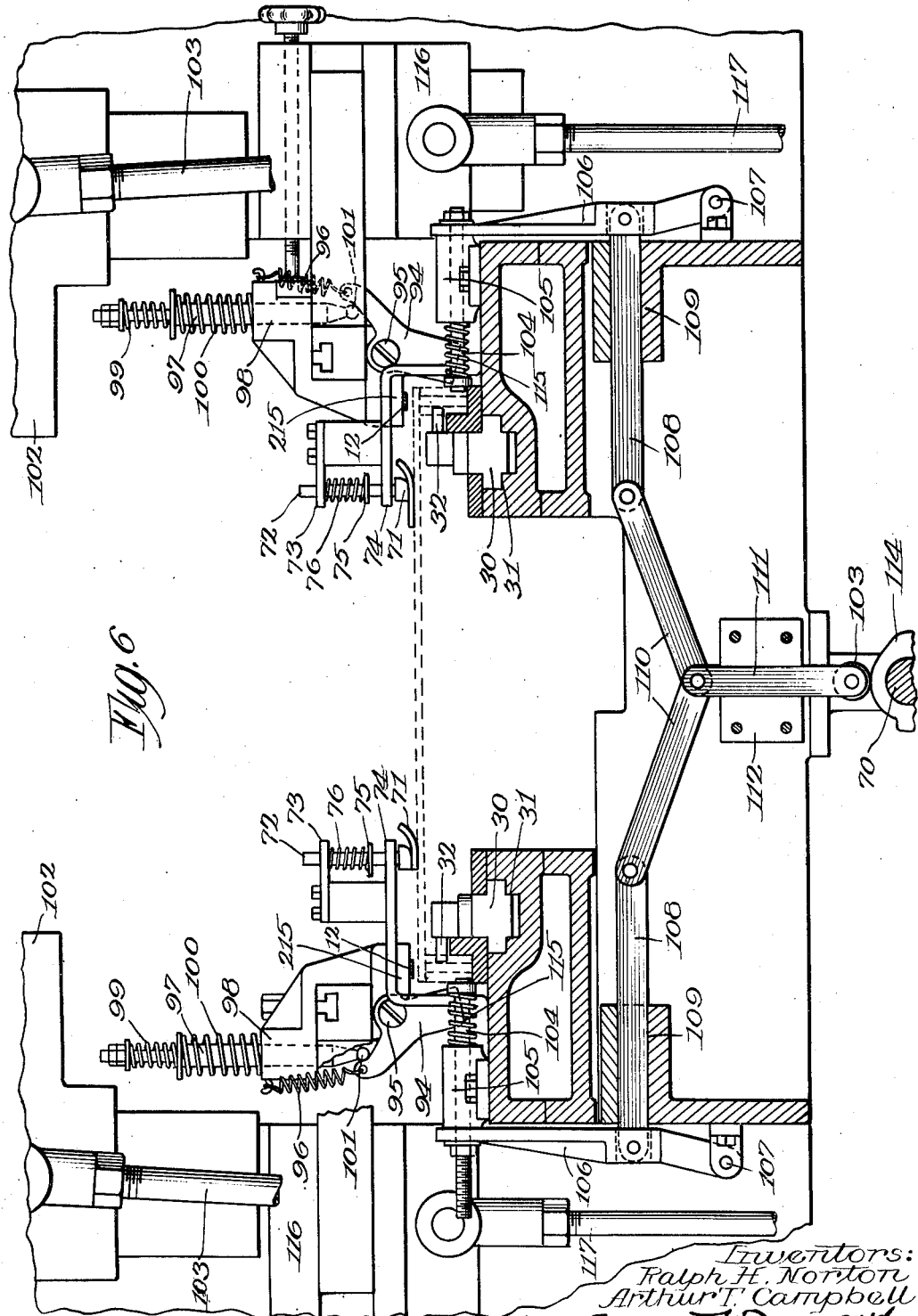

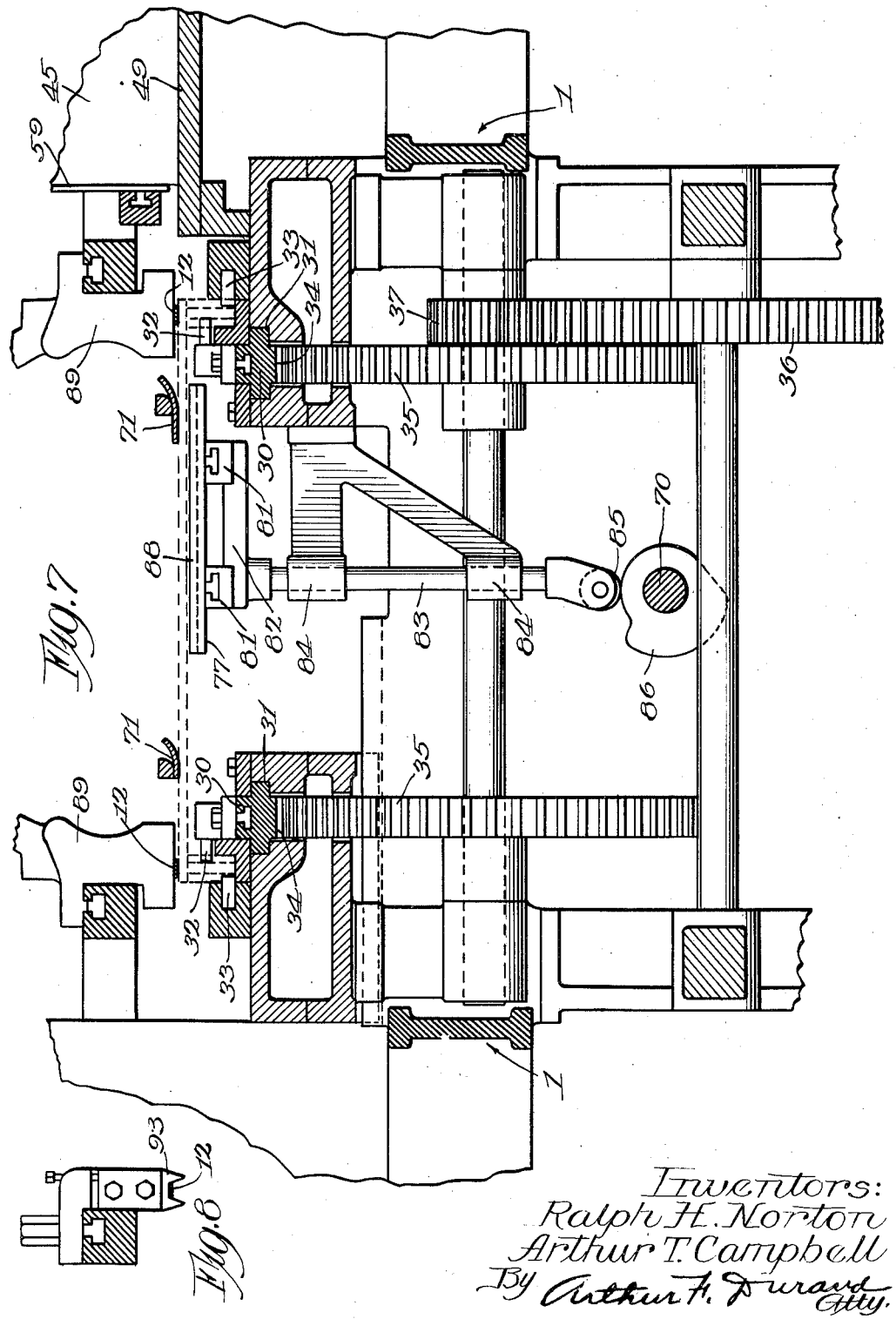

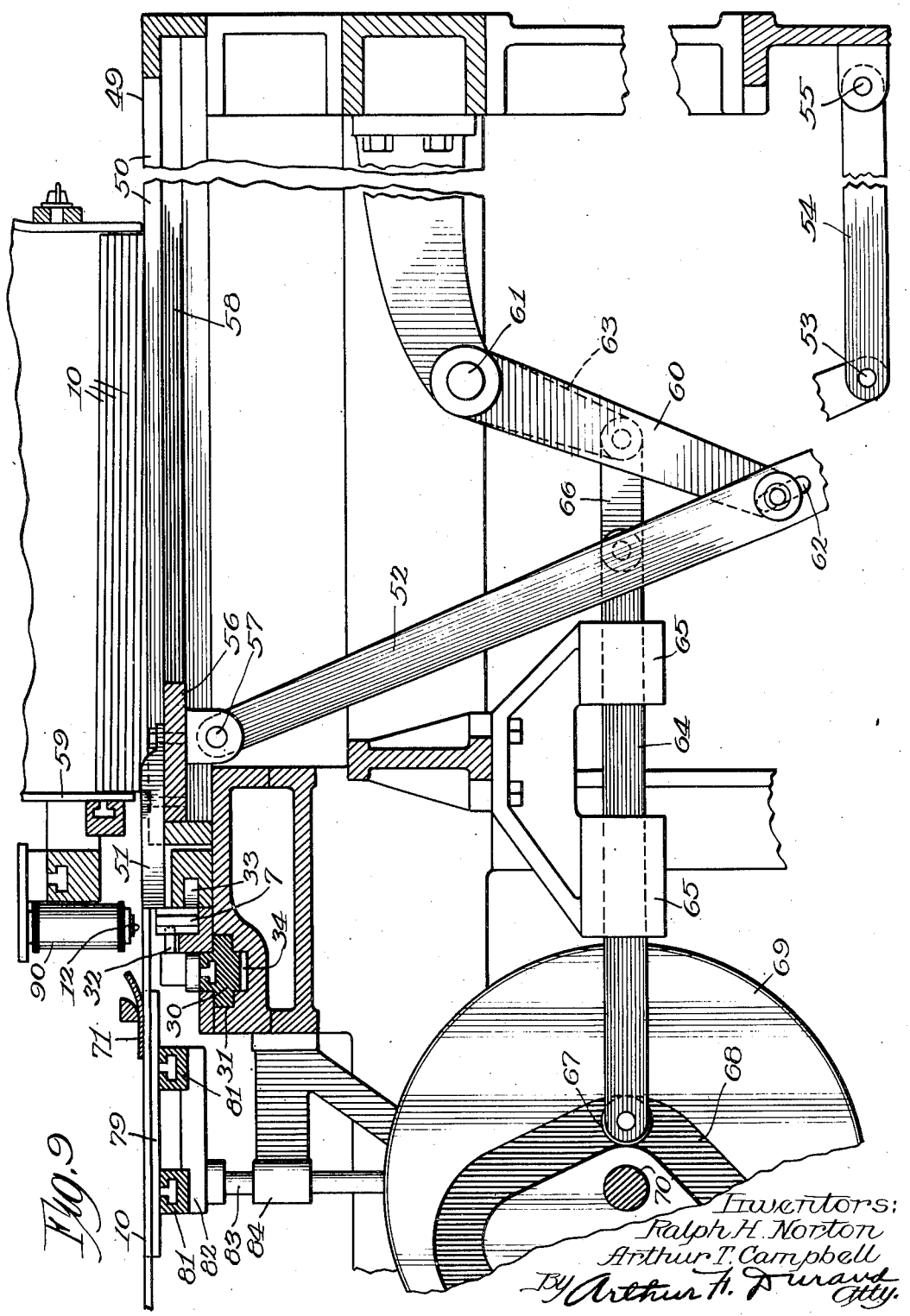

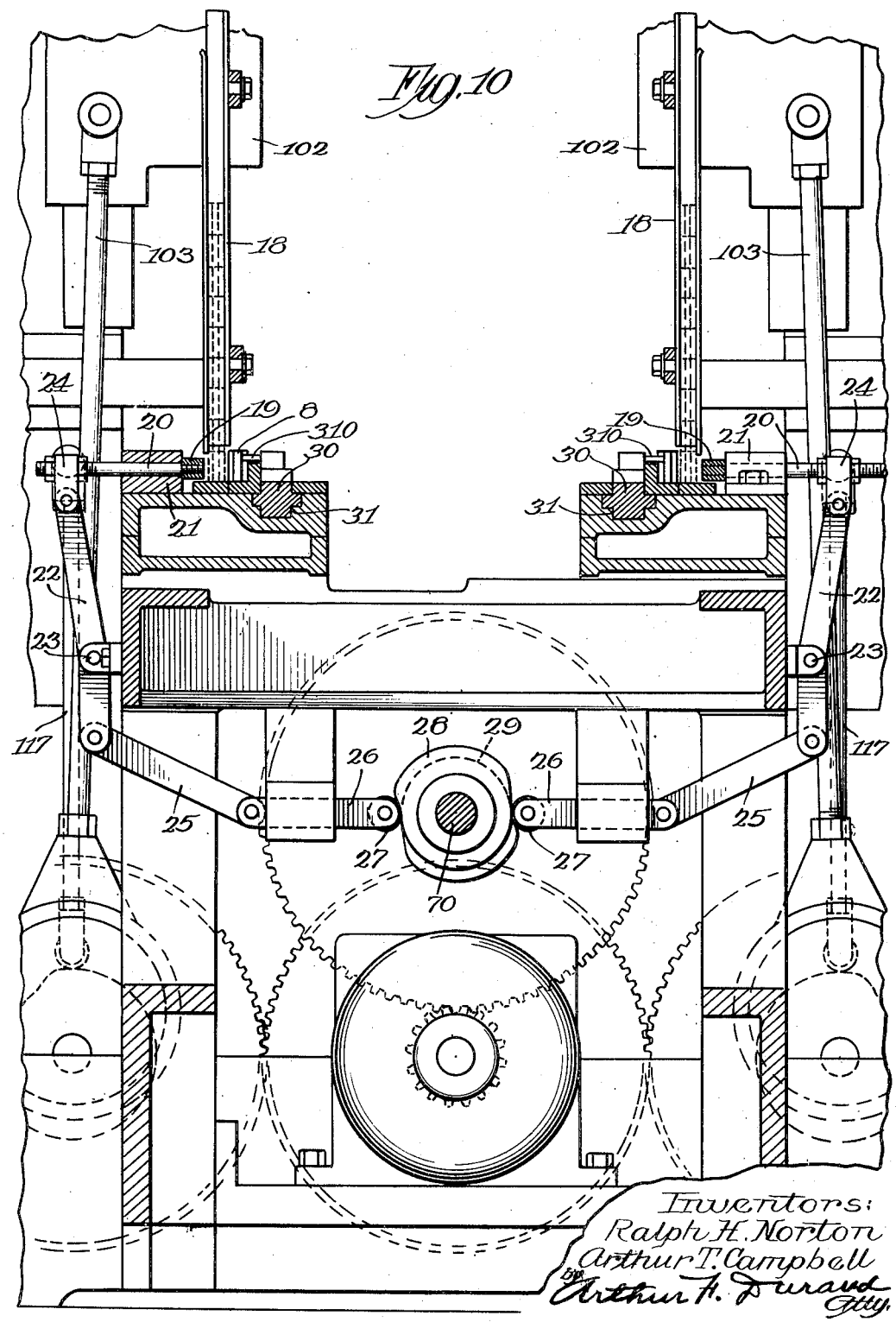

1,612,207

UNITED STATES PATENT OFFICE.

RALPH H. NORTON, OF CHICAGO, ILLINOIS, AND ARTHUR TALBOT CAMPBELL, OF SEATTLE, WASHINGTON, ASSIGNORS TO BAND-BOUND BOX COMPANY, OF SEATTLE, WASHINGTON, A CORPORATION OF WASHINGTON.

APPARATUS AND METHOD FOR MAKING BOX BLANKS.

Application filed December 17, 1925. Serial No. 75,932.

This invention relates to machinery for making metal bound boxes, and more particularly to the manufacture of boxes of that kind in which the blank from which the sides of the box are made comprises a plurality of sections reinforced on the inner side of each section by means of suitable cleats, and flexibly connected together by metal straps secured in place by nails or other fastening devices inserted through each strap and through the boards or sheets into the cleats, whereby a metal-bound, flexible blank is provided.

Generally stated, the object of the invention is to provide a novel and improved machine for automatically feeding the cleats into place, and for automatically feeding the boards or sheets in place above the cleats, and thereafter automatically inserting nails or other fastening devices to secure the straps or parallel strips of sheet metal to the boards or cleats, thereby to produce the foldable blanks, the preliminary blank thus formed being thereafter wrapped around the heads or end walls and secured in place, in any suitable manner, to produce the ultimate metal-bound box.

It is also an object to provide certain details and features of construction tending to increase the general efficiency and the desirability of an automatic metal-bound box-blank machine of this particular character.

To the foregoing and other useful ends, the invention consists in the matters hereinafter set forth and claimed, and shown in the accompanying drawings, in which—

Fig. 1 is a side elevation of an automatic metal-bound box-blank machine embodying the principles of the invention.

Fig. 2 is a plan of said machine, with certain parts removed, and showing certain portions in horizontal section.

Fig. 3 is a diagrammatic view showing the cleat-feeding apparatus of the machine, and showing some cleats and boards or sheets thereon, and showing the next three sheets or boards in position to be fed over the next set of cleats, as soon as the latter are fed along to the left and into position to receive the boards and the nails or other fastening devices.

Fig. 4 is a diagrammatic view, showing the apparatus of Fig. 3 in side elevation.

Fig. 5 is an enlarged vertical longitudinal detail section on line 5—5 in Fig. 2.

Fig. 6 is an enlarged transverse vertical detail section on line 6—6 in Fig. 2.

Fig. 7 is an enlarged transverse detail section on line 7—7 in Fig. 2.

Fig. 8 is a vertical detail section on line 8—8 in Fig. 5.

Fig. 9 is an enlarged transverse detail section on line 9—9 in Fig. 2.

Fig. 10 is an enlarged transverse detail section on line 10—10 in Fig. 2.

Fig. 11 is a plan view of three cleats employed at one edge of each blank.

Fig. 12 is a plan of one of the metal-bound blanks made by the machine.

Fig. 13 is a perspective of one of the metal-bound boxes made by folding the preliminary blank around rectangular heads or end walls, showing one end portion of the cover broken away for convenience of illustration, and showing the ends of the metal strap at this end of the box upstanding, instead of being folded down and nailed in place, as indicated at the other end of the box.

Fig. 14 is a vertical longitudinal detail section on line 14—14 in Fig. 13.

As thus illustrated, the invention comprises a body frame 1 supported in a suitable base 2, said frame having a horizontally disposed and longitudinally arranged table-like top portion 3 upon which are provided the parallel cleat guides 4 and 5, in which the cleats 6, 7 and 8 slide endwise. The cleats 6 and 8 have tongues at their ends, and the cleats 7 have grooves or notches, as shown, thus forming tongue-and-groove joints when the blank is folded. Also, of course, with this form of cleat, the cleats 6 and 8 have shoulders a distance from their ends. The particular blank shown comprises the three sheets or boards 9, 10 and 11, laid upon the cleats 6, 7 and 8, respectively, and the sheet-metal straps 12 are secured in place by the nails 13, or by any suitable fastening devices, thereby to provide a three-section flexible blank. It will be seen that the cleats are of the tongue-and-groove kind, so that their ends interlock when the blank is folded. The blank, when finally folded, as shown in Fig. 13, around the rectangular heads or end walls 14, is then combined with the top cleats 15, which are placed in position on the upper ends of the cleats 6 and 8, and a separate cover 16 is then placed in position on the cleats 15, and the end portions of the straps 12 are then bent down and nailed in place by nails 17, or by other fastening devices, as shown. Thus the three-section blank is fabricated in the blank-making machine, and is thereafter merged into the ultimate box in any suitable or desired manner.

Therefore, for the automatic feeding of cleats to the guides 4 and 5, at the right-hand end portion of the machine, as shown in Figs. 1 and 2, cleat hoppers 18 are provided at opposite sides of the machine, and supported in any suitable manner, to feed the cleats downward to their guides, as shown in Fig. 10 of the drawings. Three cleats are fed downward, at each side of the machine, for each blank, and these cleats are then pushed laterally toward each other, from opposite sides of the machine, by the pushers 19, which are operated by reciprocating rods 20 mounted in guides 21, as shown. The rods 20 are reciprocated by pivoted levers 22, which are pivoted at 23 on the sides of the machine, through the medium of suitable adjustable connections 24 at the upper ends of said levers. The lower ends of the levers 22 are connected by links 25 to the horizontally reciprocating members 26, which latter have rollers 27 to engage the cams 28 and 29, which latter are timed to operate the pushers 19 at the right time, whereby six cleats, three at each side, are pushed into the cleat guides simultaneously. Springs (not shown) or any suitable means can be employed to return the members 19 to inoperative position.

The cleat-feeding apparatus, for feeding the cleats longitudinally of their guides, comprises the parallel members 30, which slide in guides 31, which latter are parallel with and immediately inside of the cleat guides 5 previously mentioned. The members 30 are provided with the ratchet dogs 310, as shown, these dogs being six in number and disposed in position to engage the shoulders of the cleats 6 and 8 and the extreme ends of the cleats 7 which have been shoved into the cleat guides by the pushers 19 previously described. Also, the members 30 have the ratchet dogs 32, disposed as shown, three at each side, for similarly engaging the cleats of the blank which is being nailed, so that the finished blank may be moved to the left simultaneously with the movement of six fresh cleats into position to receive the boards and nails. Stationary ratchet dogs 33 are disposed at opposite sides of the machine, in position to rub against the outer surfaces of the cleats, thereby to prevent the cleats from moving backward at any time after they arrive in position to receive the nails or other fastening devices. Thus six cleats move down in two hoppers, then move laterally toward each other, from opposite sides of the machine, and then move endwise longitudinally of the machine, in order to finally arrive in position to receive the nails. The members 30 have rack teeth 34 on their lower edges, and pinions 35 are arranged in position to engage these rack teeth, these pinions 35 being operated by gearing 36 and 37 in the manner shown in Fig. 4 of the drawings. The gear 36 is rotated first in one direction, and then in the other, in order to reciprocate the feed bars 30, by means of a pitman 38 pivoted at 39 on this gear, at one end, and pivoted on an adjustable block 40 at 41, at its other end; this adjustable block 40 being slidable in a groove 42 formed on the face or one side of the crank blade 43, which latter is rotated through the medium of bevel gearing 44 or any suitable means. This gives the feed bars 30 a reciprocating motion, in properly timed relation to the other operations, whereby to feed the cleats into position to receive the nails, and whereby to feed the finished blanks out of the way; a fresh set of cleats being fed into position to receive nails, each time a finished blank is fed out of the way and to the delivery end of the machine at the left in Figs. 1 and 2 of the drawings.

The means for feeding the sheets or boards 9, 10 and 11, of each blank, preferably comprise three hoppers formed by the vertically disposed and transversely arranged walls 45, 46, 47 and 48. The table or bottom 49 of these three hopper compartments is provided with slots 50, extending transversely of the machine, and the slides 51 are arranged to slide in these slots, being actuated by the lever 52, which is suitably pivoted at 53 at its lower end on a link 54, which latter in turn is pivoted at 55 on the frame of the machine. The feed slides 51 are all suitably bolted to the main slide 56, to which the lever 52 is pivoted at 57, the slide 56 operating in guides 58 of any suitable character mounted in a stationary position on the frame of the machine. The partitions 45, 46, 47 and 48 have inner end flanges 59, as shown in Fig. 2, which engage the end edges of the boards which are laid on top of each other in the hopper compartments, as shown in Fig. 9. A lever 60 is pivoted on a stationary portion of the machine at 61, and is connected at its lower end to a slot 62 in the lever 52, and an arm 63 is rigid with the lever arm 60, whereby actuation of the arm 63 will actuate the lever 52 and operate the slides 51 to feed three boards in position to receive the nails. For this purpose, a horizontally disposed and transversely arranged reciprocating bar 64 is provided, and arranged to slide in bearings 65 mounted in a stationary position on the frame of the machine. At one end, this bar 64 is connected by a link 66 with the lower end of the arm 63 previously mentioned, and the other end of the bar 64 has a roller 67 which engages the cam groove 68 in the rotary cam 69, which latter is mounted on the longitudinally arranged shaft 70 and operated in properly timed relation to the other operations of the machine. Thus, each time the lever 52 moves to the right, in Fig. 9, the feed slides 51 move along under the lowermost boards in the hoppers, until the ends of these slides are in position to engage the outer end edges of the boards. Then the boards move downward the thickness of one board, and then the lever 52 moves to the left, causing the slides to move three boards from the bottoms of the three stacks of boards in position to receive the nails 13, which fasten the straps 12 to the boards and cleats. Thus the boards are arranged in proper relation in the hopper compartments, in position to be moved transversely of the machine into position to receive the nails, and in a plane above the plane of the cleats, whereby each complete automatic assembly operation comprises the automatic feeding of six cleats and three sheets or boards into position to have the boards or sheets, with the sheet-metal straps thereon, fastened to the cleats, to produce blanks of the kind shown in Fig. 12 of the drawings.

When the boards are thus fed into position, they are received under the presser bars 71, which are disposed in position as shown more clearly in Figs. 6 and 7, these bars having stems 72 which extend through stationary bracket arms 73 and 74 carried by any suitable portion of the body frame. A shoulder 75 is provided on each stem, and a coil spring 76 is interposed between the shoulder 75 and the bracket 73, whereby the bars 71 are pressed yieldingly upon the top of the boards.

To support the boards, when they are first fed into position to receive the nails, plates 77, 78, 79 and 80 are provided, and arranged transversely of the machine, upon the longitudinally disposed parallel bars 81, which latter are in turn carried by the vertically movable supports 82, the latter having downwardly-extending stems 83 which slide up and down in the stationary bearings 84, suitably carried by the body frame. The lower ends of these stems 83 are provided with rollers 85 which are actuated by the cams 86 and 87, whereby the boards at the proper time are lowered upon the cleats, which are in position to have the boards and metal straps 12 nailed thereto. The plates 77 and 80 have outside flanges 88 which engage the outer edges of the boards 9 and 11, to hold them in properly spaced relation, and the middle board 10 is fed into proper position between the two outside boards.

When the plates 77, 78, 79 and 80 are lowered in unison, the flanges 88 are brought below the lower surface of the boards, so that the blank, after being nailed, can then move on and make way for a fresh set of cleats and boards, as will hereinafter more fully appear.

Of course, any suitable or desired means can be employed for driving nails or staples, or other fastening devices, through the metal straps, to fasten them to the boards and cleats. As shown, ordinary nailers 89 are employed for this purpose, and are operated in any suitable or desired manner to insert nails or other fastening devices at the proper time, after the assembly of the cleats and boards is complete.

The metal straps 12 are fed from any suitable or desired source, beneath the nailers 89, as shown, and are held up by magnets 90 to permit the feeding of the boards into position below. These magnets may be energized by any suitable or desired circuit arrangements, and may be automatically controlled in any suitable or desired manner. Suitable devices 91 and 92, such as rolls, are provided to tension or act on the straps in any desired manner, to insure the delivery or feeding of the straps in proper form for nailing, and guides 93 are also provided, of the kind shown in Figs. 5 and 8, to hold the straps against lateral displacement adjacent the nailers, so that the straps will be in proper position to be fastened to the blanks.

After the nailing operation is complete, the feed bars 30 move forward, to push the finished blank out of the way, and to bring the fresh cleats and boards into position to be nailed. The straps must be cut, of course, to release the finished blank, and this is done by means of the cutters 94, which are pivoted upon suitable portions of the machine at 95, and which are held in normal position by springs 96, in the manner shown. The vertically disposed actuators 97 are mounted to slide up and down in the stationary bearings 98, and are held in raised position by the springs 99 and 100, each actuator having a tip or lower end 101 for engaging its allotted cutter 94, as shown, whereby downward movement of the actuators will rock the cutters and cause the latter to sever the straps 12 at the proper time, the different parts being properly timed in their action for this purpose. Each actuator may be composed of two parts telescoped together, so that the coil spring 99 will be subject to compression first, by downward movement of the upper and inside portion of the actuator, and whereby the coil spring 100 will be compressed, when pressure is applied to the upper end of the actuator. This pressure is supplied by the hammer blocks 102 that are mounted to reciprocate up and down on the frame of the machine, by means of pitmen 103, or in any suitable manner, these hammer blocks being disposed in position to engage the upper ends of the actuators, and to move downward a distance sufficient to cause the operation of the cutters at the proper time.

During the said cutting operation, and when the feed bars 30 release the finished blank and move back to the position shown in Fig. 2, the ratchet dogs 33 hold the blank which is in nailing position against backward movement. At the same time, something must be provided to hold the finished blank, which has been moved to the left-hand end of the machine in Fig. 2, in position against backward movement. For this purpose, therefore, horizontally disposed presser rods 104 are provided, and adapted to reciprocate horizontally and transversely in stationary bearings 105 at opposite sides of the machine. These presser rods are in position to engage the outer sides of the cleats of the blank which is severed by the cutters, and to withdraw these rods or detents, as they may be called, from engagement with the cleats, levers 106 are provided and pivoted at 107 on the opposite sides of the machine, and suitably connected to the said rods or detents 104, so that outward movement of these levers will disengage the detents from the cleats of the finished blank, allowing the latter to be removed by having been pushed out of the way by the next blank. Said levers 106 are connected to transversely arranged and horizontally movable bars 108, which are slidable in bearings 109, and which are connected together through toggle-joint links 110, as shown. The toggle joint is connected with the upper end of the vertically movable bar 111, which latter slides up and down in the stationary bearing 112, and which is provided at its lower end with a roller 113 to engage the cam 114 on the shaft 70 previously mentioned. The operation of the cam 114 is so timed that the bar 111 is moved upward at the right time to move the levers 106 outwardly, against the tension of the springs 115 on the detents, thereby to release the finished blank. Thereafter, the action of the cam 114 is such that the detents 104 assume their operative positions to engage the next blank which has been moved into position to have the straps cut or severed at the rear end thereof. Thus, while the feed bars 30 are stationary, in the position shown in Fig. 2, or after they start back, the nailing operation occurs on the boards and cleats in position for such operation, and the finished blank ahead is severed by the cutting of the straps, in the manner explained, of course, during the time that both the finished blank and the blank being made are stationary. The straps 12, of course, are fed forward by the movement of the finished blank into position to have the straps severed, and each movement of the finished blank out of the way serves to feed fresh sections of the strap metal into position to be nailed or otherwise fastened to the next blank.

Blanks of different lengths can be made. For this purpose, the nailers are adjustable toward and away from each other, in a manner common on nailing machines; also, the plates 77, 78, 79 and 80 are adjustable toward and away from each other, on the bars 81, in any suitable or desired manner. Also, for this purpose, the ratchet dogs 310 and 32 are adjustable toward and away from each other on the bars 30, in any suitable or desired manner, whereby cleats of different lengths can be employed, and sheets of different widths can be used. Of course, when the width of the sheets is changed, the hopper walls 45, 46, 47 and 48 are adjusted toward or away from each other, in the hopper structure, in any suitable or desired manner, as may be made necessary by any changes in the width of the boards. Thus, blanks of different lengths can be made, and boxes of different sizes can be made.

Now, in operation, the boards and cleats may move into nailing position, at about the same time, below the nailers, by timing the cleat-feeding and board-feeding devices for that purpose; or the different devices may be timed in their operation to first feed the cleats under the nailers, and to then feed the sheets over the cleats; or, again, the boards can be fed into position below the nailers, and the cleats can then be fed under the boards; but, preferably, the cleats and boards are moved into position below the staplers at about the same time. When the blank is finished, so far as nailing is concerned, it is moved along to the left, in Fig. 2, as previously explained, and during the nailing operation on the next succeeding blank the cutters 94 are then operated, in the manner explained, to cut the straps between these cutters and the ledger blades 215 under which the straps are held by the guides and the magnets previously described. In the type of nailing mechanism shown and described, the heads 116 are moved up and down, by the pitmen 117, in the well known manner, and thus the cutting devices 94 are moved up and down, but this does not interfere with the cutting action, which occurs simultaneously with the nailing operation, and to some extent the lifting of the cutters 94 gets them out of the way of the work, so that new and finished work can feed along in the desired manner. The springs 99, which are first compressed, in the cutting action, as explained, have the further advantage that breakage will be prevented in the event that the cutters 94 might strike the box parts or something else, as in that event these springs would be compressed and nothing would be broken. However, these springs are stiff to insure the cutting of the straps in the desired manner, and serve to cushion the blow of the heads 102 on the upper ends of the plungers or vertically reciprocating members 97 in the manner explained. The magnets 90 can be energized constantly, as the nailers will press the straps downwardly away from the magnets, when the nailing operation occurs; or, any suitable means (not shown) can be employed for automatically controlling the magnets, to energize and de-energize them at different times, if preferred. The important thing, of course, so far as these magnets is concerned, is that the straps be held up while the boards are being fed under them, in the manner previously explained, and the downward motion of the nailers can press the straps away from the magnets, as only slight magnetism is needed to hold the straps up, or the magnets can be deenergized at this time to release the straps during the nailing operation.

What we claim as our invention is:

1. In machinery for making box blanks by combining cleats and sheets with metal binding, the combination of mechanism for feeding the cleats longitudinally in properly spaced relation, into position for the fastening of the metal binding to the sheets and cleats, devices for feeding the sheets transversely across the paths of the cleats, in a plane above the plane of the cleats, and means for feeding and guiding the metal binding longitudinally of the machine, parallel with the cleats, in a plane above the sheets, in position to receive fasteners to secure the binding and sheets to the cleats.

2. A structure as specified in claim 1, said cleat feeding mechanism comprising reciprocating feed bars having ratchet dogs on the sides thereof to engage the cleats, in combination with means to hold the cleats against backward movement when the feed bars move backward to receive a fresh set of cleats.

3. A structure as specified in claim 1, in combination with means for automatically feeding the cleats downward and then laterally into position to be engaged by said feed mechanism.

4. A structure as specified in claim 1, in combination with means to automatically supply the sheets to said feed devices, and means to lower the fed sheets into position on the cleats.

5. A structure as specified in claim 1, in combination with means for automatically moving a plurality of cleats sidewise into position at one side of the machine, and means for automatically moving a like plurality of cleats sidewise into position at the other side of the machine, whereby to supply a complete set of cleats in position to be engaged by said feed mechanism.

6. A structure as specified in claim 1, in combination with instrumentalities to support the sheets while being fed over the paths of the cleats, adapted to move downward to rest the sheets on the cleats.

7. A structure as specified in claim 1, in combination with devices to automatically sever the metal binding at the rear end of each finished blank, and means to hold each finished blank in position for said severing operation.

8. A structure as specified in claim 1, having parallel stationary guides for the cleats, in which the cleats are supported before and during and after the fastening of the binding thereto, and means to feed the cleats laterally into said guides.

9. A structure as specified in claim 1, in combination with ratchet dogs disposed in position to hold the cleats against backward movement from the positions which they occupy during the fastening of the binding thereto, said feed mechanism being movable backward to receive another set of cleats.

10. In a machine for making box blanks by combining sheets and cleats with metal binding, the combination of hoppers for the cleats, pushers to feed cleats laterally in a horizontal plane from the bottoms of said hoppers, and feed mechanism to move the cleats longitudinally after being fed laterally into position, adapted to have motion while the cleats are stationary in position to have the sheets attached thereto.

11. A structure as specified in claim 10, in combination with devices to automatically supply sheets in position over the cleats, and instrumentalities to supply metal binding in position over the sheets, together with fastener drivers to insert fasteners to secure the binding and sheets to the cleats.

12. A structure as specified in claim 10, comprising stationary and parallel longitudinal guides for the cleats, in which the cleats are moved endwise after being moved laterally into alignment therewith, and means to lower sheets on to fed cleats in said guides.

13. A structure as specified in claim 10, in combination with means for feeding sheets transversely of the machine, above the plane of the cleats, into position for the fastening of the binding and sheets to the cleats.

14. A structure as specified in claim 10, in combination with means for feeding sheets in a plane above the path of the cleats, at the same time that the cleats are moving longitudinally, and means for then lowering the sheets onto the cleats.

15. A structure as specified in claim 10, in combination with means for feeding sheets in a plane above the cleats, in position for the fastening of the sheets to the cleats, and means for lowering the sheets onto the cleats, preliminary to the fastening of the sheets to the cleats, together with means for supplying flexible binding members above the sheets in position to be fastened thereto and to the cleats.

16. A structure as specified in claim 10, said mechanism for feeding cleats longitudinally comprising longitudinally reciprocating feed bars, having means thereon to engage the cleats, and instrumentalities to reciprocate said feed bars in the required manner.

17. A structure as specified in claim 10, in combination with means for automatically placing sheets on the cleats, after the cleats are moved into position to have the sheets secured thereto.

18. A structure as specified in claim 10, in combination with instrumentalities to supply flexible binding and sheets to said cleats, in position for the insertion of fasteners through the binding and sheets into the cleats, and means for severing the metal binding at the rear end of each blank while the blank in rear thereof is being fastened together.

19. In a machine for making box blanks by combining sheets and cleats with metal binding, the combination with means for feeding the cleats into position, and instrumentalities for automatically and simultaneously placing all of the sheets in position on said cleats, together with means for feeding metal binding over the sheets in position to be fastened to the sheets and cleats.

20. A structure as specified in claim 19, said instrumentalities comprising means for feeding all of the sheets of each blank horizontally, transversely of the cleats, in a plane above the cleats.

21. A structure as specified in claim 19, said instrumentalities comprising means for feeding all of the sheets of each blank horizontally, transversely of the cleats, in a plane above the cleats, in combination with means for automatically lowering the plurality of sheets onto the cleats.

22. A structure as specified in claim 19, said instrumentalities comprising hoppers in which the sheets are held in stacks, and comprising means for feeding the lowermost sheet of each stack in a plane above the cleats, so that the sheets are fed endwise across the machine, and having means to support the sheets above the cleats, and then lower the sheets onto the cleats.

23. The method of assembling and fastening together the sheets and cleats and metal binding of box blanks, comprising the relative positioning of all the cleats of the blank as a separate operation, the relative positioning of all the sheets of the blank as a separate operation, so that all the cleats of the blank are in predetermined foldable relation before having the sheets applied thereto, and so that all the sheets of the blank are in predetermined foldable relation before being fastened to the cleats, thereafter positioning the plurality of cleats and the plurality of sheets in predetermined relation to form a blank, and thereafter fastening the metal binding to the sheets and cleats.

24. A method as specified in claim 23, in combination with the preliminary step of forming two rows of cleats, with the members of each row in foldable relation to each other but with the two rows too wide apart for the ultimate blank, and thereafter placing the two rows the distance apart required by the blank.

25. A method as specified in claim 23, comprising the insertion of the plurality of sheets between the cleats and the metal binding, before the fastening operation is performed thereon.

26. The method of combining sheets and cleats and metal binding to form flexible box blanks, comprising the arrangement of the metal binding in place, for the fastening operation, thereafter arranging all the cleats in their proper relation and also arranging all the sheets in their proper relation, thereafter feeding the relatively positioned cleats and the relatively positioned sheets under said binding, and then fastening the binding and sheets and cleats together.

27. In a machine for making box blanks by combining sheets and cleats with metal binding, the combination of hoppers for the cleats, pushers to feed cleats laterally in a horizontal plane from the bottoms of said hoppers, and feed mechanism to move the cleats longitudinally after being fed laterally into position, in combination with means for feeding sheets transversely of the machine, above the plane of the cleats, into position for the fastening of the binding and sheets to the cleats.

28. In a machine for making box blanks by combining sheets and cleats with metal binding, the combination of hoppers for the cleats, pushers to feed cleats laterally in a horizontal plane from the bottoms of said hoppers, and feed mechanism to move the cleats longitudinally after being fed laterally into position, in combination with means for feeding sheets in a plane above the path of the cleats, at the same time that the cleats are moving longitudinally, and means for then lowering the sheets onto the cleats.

29. In a machine for making box blanks by combining sheets and cleats with metal binding, the combination of hoppers for the cleats, pushers to feed cleats laterally in a horizontal plane from the bottoms of said hoppers, and feed mechanism to move the cleats longitudinally after being fed laterally into position, in combination with means for feeding sheets in a plane above the cleats, in position for the fastening of the sheets to the cleats, and means for lowering the sheets onto the cleats, preliminary to the fastening of the sheets to the cleats, together with means for supplying flexible binding members above the sheets in position to be fastened thereto and to the cleats.

30. In a machine for making box blanks by combining sheets and cleats with metal binding, the combination of hoppers for the cleats, pushers to feed cleats laterally in a horizontal plane from the bottoms of said hoppers, and feed mechanism to move the cleats longitudinally after being fed laterally into position, said mechanism for feeding cleats longitudinally comprising longitudinally reciprocating feed bars, having means thereon to engage the cleats, and instrumentalities to reciprocate said feed bars in the required manner.

31. In a machine for making box blanks by combining sheets and cleats with metal binding, the combination of hoppers for the cleats, pushers to feed cleats laterally in a horizontal plane from the bottoms of said hoppers, and feed mechanism to move the cleats longitudinally after being fed laterally into position, in combination with means for automatically placing sheets on the cleats, after the cleats are moved into position to have the sheets secured thereto.

32. In a machine for making box blanks by combining sheets and cleats with metal binding, at least some of the cleats having shoulders a distance from the ends thereof, the combination of hoppers for the cleats, pushers to feed cleats laterally in a horizontal plane from the bottoms of said hoppers, and feed mechanism to move the cleats longitudinally after being fed laterally into position, said mechanism for feeding cleats longitudinally comprising longitudinally reciprocating feed bars, having means thereon to engage the cleats, disposed in position to engage said shoulders, and instrumentalities to reciprocate said feed bars in the required manner.

33. In a machine for making box blanks by fastening cleats and sheets and flexible binding members together, at least some of the cleats having shoulders a distance from the ends thereof, the combination of instrumentalities for engaging the cleats to feed them endwise, disposed in position to engage said shoulders, means for causing reciprocation of said instrumentalities, and means for assembling the sheets and flexible binding members in position to be fastened to said cleats.

34. In machinery for making box blanks by combining cleats and sheets with metal binding, at least some of the cleats having shoulders a distance from the ends thereof, the combination of mechanism for feeding the cleats longitudinally in properly spaced relation, by engagement with said shoulders, into position for the fastening of the metal binding to the sheets and cleats, devices for feeding the sheets transversely across the paths of the cleats, in a plane above the plane of the cleats, and means for feeding and guiding the metal binding longitudinally of the machine, parallel with the cleats, in a plane above the sheets, in position to receive fasteners to secure the binding and sheets to the cleats.

Specification signed the 7th and 24th days of November, 1925.

RALPH H. NORTON.
ARTHUR TALBOT CAMPBELL.